F. SWEARINGIN.
SPRAYING APPARATUS.
APPLICATION FILED JAN. 28, 1908.

929,343.

Patented July 27, 1909.
2 SHEETS—SHEET 1.

Witnesses
C. E. Smith.

Inventor
Frank Swearingin.
By Victor J. Evans Attorney

F. SWEARINGIN.
SPRAYING APPARATUS.
APPLICATION FILED JAN. 28, 1908.

929,343.

Patented July 27, 1909.
2 SHEETS—SHEET 2.

Witnesses
C. E. Smith
Wm. Rooth

Inventor
Frank Swearingin.

By Victor J. Evans
Attorney

UNITED STATES PATENT OFFICE.

FRANK SWEARINGIN, OF BATCHTOWN, ILLINOIS.

SPRAYING APPARATUS.

No. 929,343.  Specification of Letters Patent.  Patented July 27, 1909.

Application filed January 28, 1908. Serial No. 413,097.

*To all whom it may concern:*

Be it known that I, FRANK SWEARINGIN, a citizen of the United States, residing at Batchtown, in the county of Calhoun and State of Illinois, have invented new and useful Improvements in Spraying Apparatus, of which the following is a specification.

This invention relates to spraying apparatus or machines such as are employed for spraying fruit trees, vines, etc., and the object of the invention is to provide a machine or apparatus of this character, of a simple effective and inexpensive construction adapted to be drawn by horses and provided with means actuated by the movement of the machine for effecting the spraying.

Another object of the invention is to provide a machine or apparatus of this character provided with a fluid cylinder and an air cylinder and having a pump actuated by the movement of the machine which sucks the spraying fluid from its cylinder into the air cylinder, thereby compressing the air within the cylinder and providing for the ejection of the fluid by the compressed air within the cylinder without the aid of other mechanism.

A still further object of the invention is to provide a device of the character described with an agitating arm actuated by the reciprocation of a pump plunger rod, by which the spraying fluid within a cylinder is thoroughly agitated as the machine is in motion.

To these and other ends the invention resides in the novel construction of elements and their arrangement in operative combination hereinafter fully described and claimed.

Figure 1:
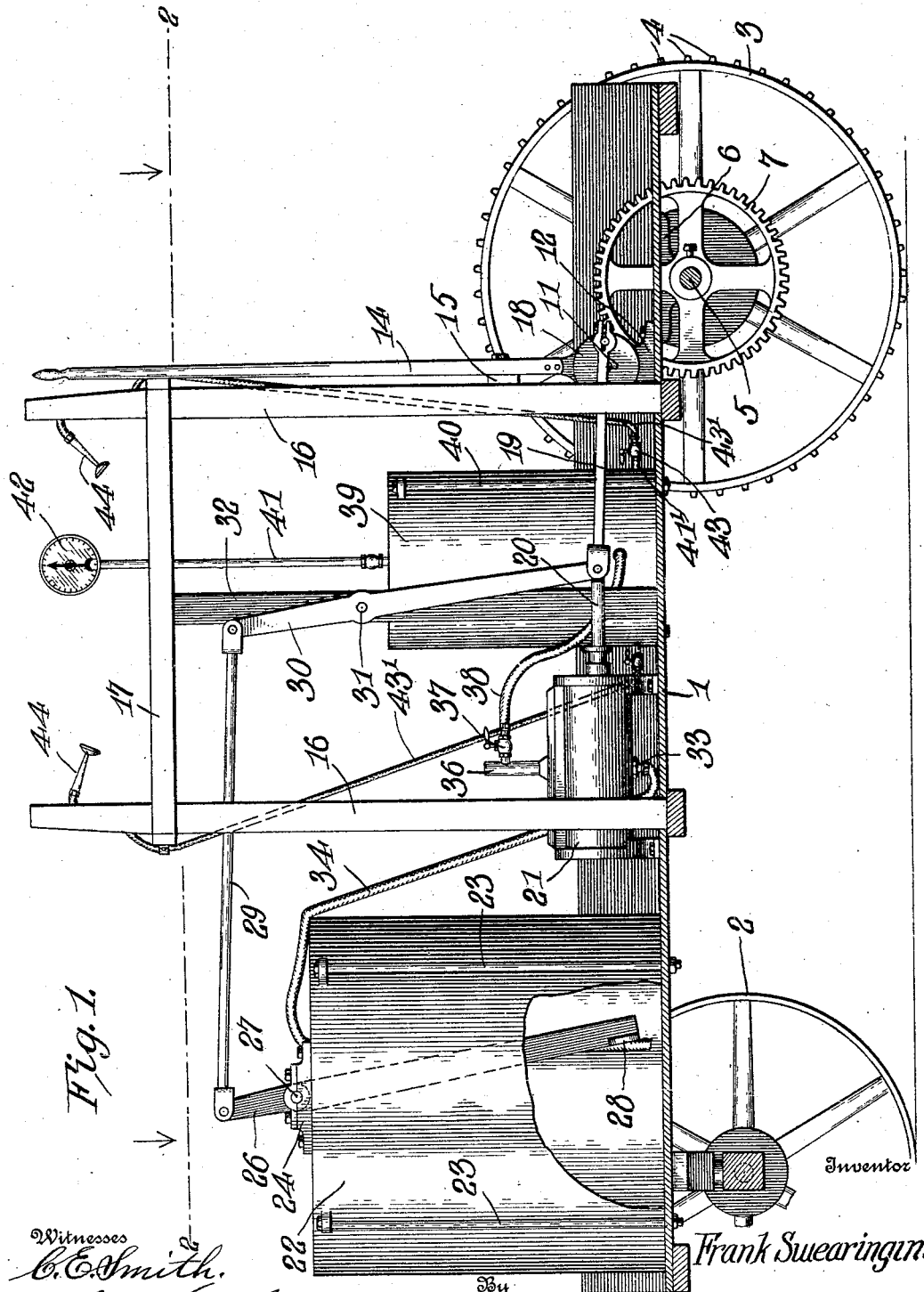
Figure 2:
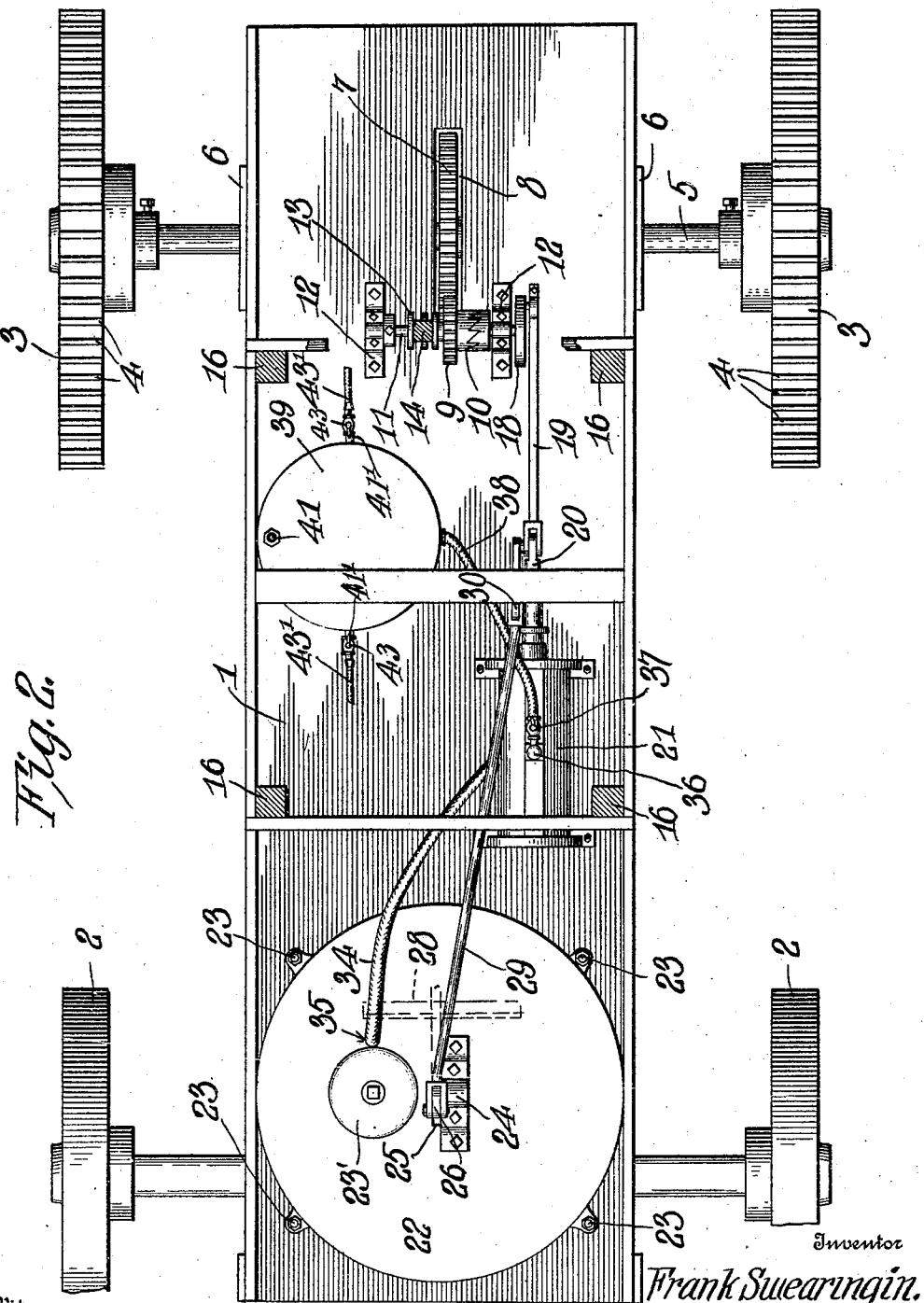

In the accompanying drawings, Figure 1 is a sectional view of a wagon body provided with my improved spraying apparatus. Fig. 2 is a longitudinal sectional view upon the line 2—2 of Fig. 1 and looking in the direction of the arrows.

In the accompanying drawings the numeral 1 designates the body of an ordinary farm vehicle, having the front or steering wheels 2 and the rear wheels 3. The wheels 3 employed in the present instance have their treads provided with ribs 4, to insure the revolution of the wheels in regard to the various conditions of the soil which they are adapted to traverse. The axle 5 of the rear or power wheels 3 is securely retained upon the wheels so that it will revolve with the wheels, and is mounted under the body of the machine in suitable brackets 6. Centrally positioned upon the axle 5, and securely retained thereon is a toothed wheel 7, having its upper portion extending above the bottom of the wagon through a suitable slot or opening 8, provided for this purpose. The wheel 7 is adapted to mesh with a smaller toothed wheel 9 secured to one member of a clutch 10, and mounted upon a suitable shaft 11 provided with bearings 12 secured to the bottom of the machine. The clutch 10 is of the usual toothed form comprising a member fixedly secured to the shaft 11, and a member slidably mounted thereon and adapted for the engagement with the fixed member. The slidable member of the clutch to which the toothed wheel 9 is secured, is provided with a collar 13, and positioned between the flanges of this collar is the bifurcated end of a shifting lever 14, pivotally secured to a transverse beam 15 of one of the uprights 16, which support a platform 17 upon the body of the machine. The shaft 11 is provided upon one of its extremities with a disk 18, and pivotally connected with this disk 18 near its periphery is a pitman rod 19. The free extremity of this pitman rod 19 is connected with a plunger rod 20 provided upon a plunger adapted for reciprocation with a pump 21, which is also secured to the body of the machine.

Mounted upon the body of the machine, and near the front end thereof is a fluid containing cylinder 22 securely retained in position upon the machine by a series of brace rods 23. This fluid receptacle is provided with a suitable inlet opening having a detachable cover or closure 23' and the top of the receptacle is provided with a suitable bracket 24, positioned adjacent an opening or cutaway portion 25, which is provided for the reception of an agitator arm 26, which is pivotally secured to the bracket 24 as at 27. The arm 26 is provided at its lower extremity within the cylinder with a transverse arm 28, which is adapted upon the oscillation of the arm 26, to stir and thoroughly agitate the fluid within the receptacle 22. The extremity of the arm 26, above its pivot point 27, is provided with a connecting bar 29, and the opposite end of this rod 29 is pivotally connected with a link 30. The link 30 is pivoted as at 31 to an upright 32, provided upon the frame of the platform 17. The free end of the link 30 is pivotally connected with the pitman 19 and the plunger rod 20, so that upon reciprocation of the plunger rod and pitman the link 30 is oscillated upon its pivot, thereby imparting motion to the connecting rod 29 and the agitator arm 26, and thus effectively stirring and mixing the fluid within the receptacle 22.

The pump 21 is provided with an inlet port 33, to which is connected a flexible hose 34, adapted for insertion within an opening 35, provided within the top of the receptacle 22, and adapted to extend within the receptacle to a point near the bottom thereof. The pump 21 is provided, also, with an outlet port 36 having an offset provided with a cock 37, to which is attached a flexible tube 38 having its end connected with the interior of an air cylinder 39. This cylinder 39 is secured upon the bottom of the machine by a series of brace rods 40, and the cylinder is provided with a pipe 41, having a gage 42, by which the amount of compression of the air within the cylinder may be readily ascertained. The cylinder 39 is provided with a plurality of nipples 41', each of which being provided with cocks 43, by which the outlet of the contents of the cylinder 39 is regulated. Secured to the nipples 41 are flexible tubes 43', having their free ends provided with nozzles 44, by which the fluid is sprayed upon the trees or vines.

The operation of my device is as follows: The machine is propelled, revolving the toothed wheel 7, which in turn revolves the toothed wheel 9 and the disk 18, it being understood that the clutch members are thrown into engagement with each other. The disk 18 reciprocates the pitman 19 and the plunger rod 20, and at the same time imparting motion to the link 30, thereby agitating the liquid within the receptacle 22. As the plunger rod 20 is reciprocated, the plunger within the pump 21 sucks a quantity of the spraying fluid from the cylinder 22 through the flexible tube 34 upon one of its strokes, and upon its opposite stroke forces the fluid through the outlet pipe 36, into the flexible tube 38 and to the interior of the cylinder 39, it being understood that the inlet and outlet ports of the pump are provided with the ordinary flap valves so that the intake and ejection of the fluid are regulated with regard to the reciprocation of the plunger, the valve regulating the intake being opened when the valve regulating the outlet is closed and vice versa. The cylinder 39 is substantially air tight, and, it will be seen that as the fluid is forced into the receptacle from the pump, the air within the receptacle will be compressed, and the amount of pressure thus obtained will be clearly indicated upon the gage 42. When a sufficient quantity of spraying liquid is obtained within the cylinder 39 and a desired compression of air is indicated upon the gage, the lever 14 is swung upon its pivot to disengage the members of the clutch 10, when the vehicle is free to be propelled without operating the spraying mechanism. When the machine is positioned adjacent the trees or vines to be sprayed, the cocks 43 are turned on and the spraying fluid ejected through the flexible tubes 43' and nozzles 44 under the pressure of the air within the cylinder 39.

From the above description it will be seen that I have provided a simple, comparatively cheap and effective machine for spraying trees, vines etc., one in which fluid is forced into a hollow air chamber, and ejected therefrom under the pressure of the air compressed within the chamber. It is of course understood that when a sufficient amount of air and liquid is deposited within the cylinder 39, the cock 37 is turned off before the spraying operation is commenced.

It will also be noted that by providing the device with the platform 17 the nozzles 44 connected with the flexible pipes 43' are greatly elevated above the body of the machine and the operators being also elevated are in a position to spray the tops of trees or vines without extra exertion.

Having thus fully described the invention what is claimed as new is:

1. In a spraying apparatus for trees or vines, a vehicle body, a fluid cylinder upon the body, a combined force and suction pump upon the body, a connection between the fluid cylinder and the pump, a compressed air cylinder upon the body, a connection between the pump and the said cylinder, a regulating valve upon the connection, a raised platform upon the body, a plurality of flexible outlet pipes provided with regulating valves leading from the air cylinder to the platform, and means provided upon one of the axles of the vehicle for reciprocating the piston of the pump to draw fluid from the fluid cylinder and to force the same into the compressed air cylinder.

2. In a spraying apparatus for trees and vines, a vehicle body, a fluid cylinder upon the body, an agitator arm pivotally connected to the top of the fluid chamber and having its lower portion provided with a transverse arm, a combined suction and discharge pump upon the body of the device, a connection between the fluid cylinder and the pump, a compressed air cylinder upon the body, a valved connection between the cylinder and the pump, a raised platform upon the body of the vehicle, flexible pipes extending from the air cylinder to the elevated platform, means connected with one of the axles of the vehicle for reciprocating the piston of the pump while the vehicle is in motion, means for stopping the reciprocation of the piston, a pivoted link connected with the piston rod and pivotally secured to the frame of the raised platform, and a connecting rod between this link and the agitator arm whereby fluid within the fluid cylinder is mixed as the piston is reciprocated.

In testimony whereof I affix my signature in presence of two witnesses.

FRANK SWEARINGIN.

Witnesses:
WM. H. ZIGRANG,
CHAS. A. TUDLER.